United States Patent
Kodama

(10) Patent No.: US 12,190,002 B2
(45) Date of Patent: Jan. 7, 2025

(54) IMAGE FORMING DEVICE AND METHOD FOR OUTPUTTING SCREEN INFORMATION OF A SETTING SCREEN

(71) Applicant: SHARP KABUSHIKI KAISHA, Sakai (JP)

(72) Inventor: Hirotaka Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/395,698

(22) Filed: Dec. 25, 2023

(65) Prior Publication Data
US 2024/0231715 A1  Jul. 11, 2024

(30) Foreign Application Priority Data
Jan. 11, 2023  (JP) .................. 2023-002725

(51) Int. Cl.
*G06F 3/12*  (2006.01)

(52) U.S. Cl.
CPC .......... *G06F 3/1222* (2013.01); *G06F 3/1236* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 2016/0255215 A1* | 9/2016 | Oguma | H04N 1/00854 358/1.13 |
| 2018/0004922 A1* | 1/2018 | Suzuki | G06F 21/608 |
| 2018/0351958 A1* | 12/2018 | Sakurai | H04L 63/102 |
| 2019/0207939 A1* | 7/2019 | Takamiya | H04L 63/0876 |
| 2020/0106921 A1* | 4/2020 | Nakayama | H04N 1/4413 |
| 2021/0306318 A1* | 9/2021 | Yokoyama | G06F 9/451 |
| 2022/0244896 A1* | 8/2022 | Kakutani | G06F 3/04842 |
| 2024/0012593 A1* | 1/2024 | Hosoda | G06F 3/1222 |

FOREIGN PATENT DOCUMENTS

JP  2021-152835 A  9/2021

* cited by examiner

*Primary Examiner* — Henok Shiferaw
(74) *Attorney, Agent, or Firm* — ScienBiziP, P.C.

(57) ABSTRACT

An image forming device includes an outputter that outputs, in a case where an authentication method is capable of being set and an authentication method that requires prior authorization by an authorization service is selected, screen information of a setting screen corresponding to the authentication method that requires the prior authorization by the authorization service, and one or more controllers that control output of the screen information by the outputter. The one or more controllers perform control to determine a display content of the setting screen based on an output destination of the screen information and output the screen information including the display content.

12 Claims, 17 Drawing Sheets

| OUTPUT DESTINATION | IDENTIFICATION INFORMATION (IP ADDRESS) | OUTPUT SCREEN INFORMATION |
|---|---|---|
| LOCAL | 192.168.1.aa | AUTHENTICATION EXECUTABLE SCREEN (FIRST SCREEN INFORMATION) |
| EXTERNAL TERMINAL DEVICE | IP ADDRESS OTHER THAN 192.168.1.aa | AUTHENTICATION NON-EXECUTABLE SCREEN (SECOND SCREEN INFORMATION) |

- W10 — SMTP SETTING
- R10
  - PRIMARY SERVER: smtp@aabbcc.com
  - SECONDARY SERVER:
  - PORT NUMBER: 587 (0-65535)
  - TIMEOUT: 20 SECONDS (0 TO 60)
  - SENDER NAME: abcde (WITHIN 20 FULL-WIDTH/HALF-WIDTH CHARACTERS)
  - SENDER ADDRESS: abcde@aabbcc.com (WITHIN 64 HALF-WIDTH CHARACTERS)
  - ☑ ENABLE SSL/TLS
- R20
  - AUTHENTICATION METHOD: PLEASE SELECT — P10
  - PROVIDER: A SERVICE — P12
  - ACCOUNT NAME: abcde@a_service.com — Bx10 (WITHIN 64 HALF-WIDTH CHARACTERS)

FIG. 8

SMTP SETTING

PRIMARY SERVER: smtp@aabbcc.com

SECONDARY SERVER:

PORT NUMBER: 587 (0-65535)

TIMEOUT: 20 SECONDS (0 TO 60)

SENDER NAME: abcde (WITHIN 20 FULL-WIDTH/HALF-WIDTH CHARACTERS)

SENDER ADDRESS: abcde@aabbcc.com (WITHIN 64 HALF-WIDTH CHARACTERS)

☑ ENABLE SSL/TLS

AUTHENTICATION METHOD:

PROVIDER: OAuth2.0 / USER NAME + PASSWORD / NONE ...

ACCOUNT NAME: (WITHIN 64 HALF-WIDTH CHARACTERS)

SMTP SETTING — W20

- PRIMARY SERVER: smtp@aabbcc.com
- SECONDARY SERVER:
- PORT NUMBER: 587 (0-65535)
- TIMEOUT: 20 SECONDS (0 TO 60)
- SENDER NAME: abcde (WITHIN 20 FULL-WIDTH/HALF-WIDTH CHARACTERS)
- SENDER ADDRESS: abcde@aabbcc.com (WITHIN 64 HALF-WIDTH CHARACTERS)
- ☑ ENABLE SSL/TLS R20:
- AUTHENTICATION METHOD: OAuth2.0 ˅
- PROVIDER: A SERVICE ˅
- ACCOUNT NAME: abcde@a_service.com (WITHIN 64 HALF-WIDTH CHARACTERS)
- [CONNECT (X)] — B10

SMTP SETTING

PRIMARY SERVER: smtp@aabbcc.com

SECONDARY SERVER:

PORT NUMBER: 587 (0–65535)

TIMEOUT: 20 SECONDS (0 TO 60)

SENDER NAME: abcde (WITHIN 20 FULL-WIDTH/HALF-WIDTH CHARACTERS)

SENDER ADDRESS: abcde@aabbcc.com (WITHIN 64 HALF-WIDTH CHARACTERS)

☑ ENABLE SSL/TLS

R20

AUTHENTICATION METHOD: OAuth2.0 ⌄

PROVIDER: A SERVICE ⌄

ACCOUNT NAME: abcde@a_service.com (WITHIN 64 HALF-WIDTH CHARACTERS)

M10 PLEASE PERFORM "CONNECT" ON OPERATION PANEL.

FIG. 15

| SMTP SETTING | |
|---|---|
| PRIMARY SERVER: | smtp@aabbcc.com |
| SECONDARY SERVER: | |
| PORT NUMBER: | 587 (0~65535) |
| TIMEOUT: | 20 SECONDS (0 TO 60) |
| SENDER NAME: | abcde (WITHIN 20 FULL-WIDTH/HALF-WIDTH CHARACTERS) |
| SENDER ADDRESS: | abcde@aabbcc.com (WITHIN 64 HALF-WIDTH CHARACTERS) |
| ☑ ENABLE SSL/TSL | |
| AUTHENTICATION METHOD: | OAuth ∨ |
| PROVIDER: | A SERVICE ∨ |
| ACCOUNT NAME: | ********* (WITHIN 64 HALF-WIDTH CHARACTERS) |

W50
R20
Bx10
B10 — CONNECT (X)

IMAGE FORMING DEVICE AND METHOD FOR OUTPUTTING SCREEN INFORMATION OF A SETTING SCREEN

TECHNICAL FIELD

The present disclosure relates to an image forming device and the like.

BACKGROUND ART

For example, when an image forming device such as a multifunction peripheral executes a job related to email transmission and reception, authentication by an email server is required. An authentication method of authenticating the image forming device based on a user name (ID) and a password is typically used.

Meanwhile, to replace the authentication method in the related art, there has recently been a demand for a more secure authentication method, such as OAuth 2.0 authentication, which requires advance authorization to use resources.

SUMMARY

Technical Problem

An object of the present disclosure is to provide an image forming device and the like that can help prevent reduced user convenience when outputting a setting screen related to authentication processing even when using an authentication method that requires prior authorization.

Solution to Problem

To solve the above problem, an image forming device according to the present disclosure include an outputter that outputs, in a case where an authentication method is capable of being set and an authentication method that requires prior authorization by an authorization service is selected, screen information of a setting screen corresponding to the authentication method that requires the prior authorization by the authorization service, and one or more controllers that control output of the screen information by the outputter. The one or more controllers perform control to determine a display content of the setting screen based on an output destination of the screen information and output the screen information including the display content.

An output method according to the present disclosure is an output method of outputting screen information of a setting screen corresponding to an authentication method that requires prior authorization by an authorization service, the output method including determining a display content of the setting screen in accordance with an output destination of the screen information, and outputting the screen information including the display content.

Advantageous Effects of Invention

According to the present disclosure, it is possible to provide an image forming device and the like that can help prevent reduced user convenience when outputting a setting screen related to authentication processing even when using an authentication method that requires prior authorization.

BRIEF DESCRIPTION OF DRAWINGS

FIG. 6 is a diagram showing an output destination management table.

FIG. 7 is a diagram illustrating an operation example according to the first embodiment.

FIG. 8 is a diagram illustrating an operation example according to the first embodiment.

FIG. 9 is a diagram illustrating an operation example according to the first embodiment.

FIG. 10 is a diagram illustrating an operation example according to the first embodiment.

FIG. 15 is a diagram illustrating an operation example according to the second embodiment.

DESCRIPTION OF EMBODIMENTS

Figure 1:
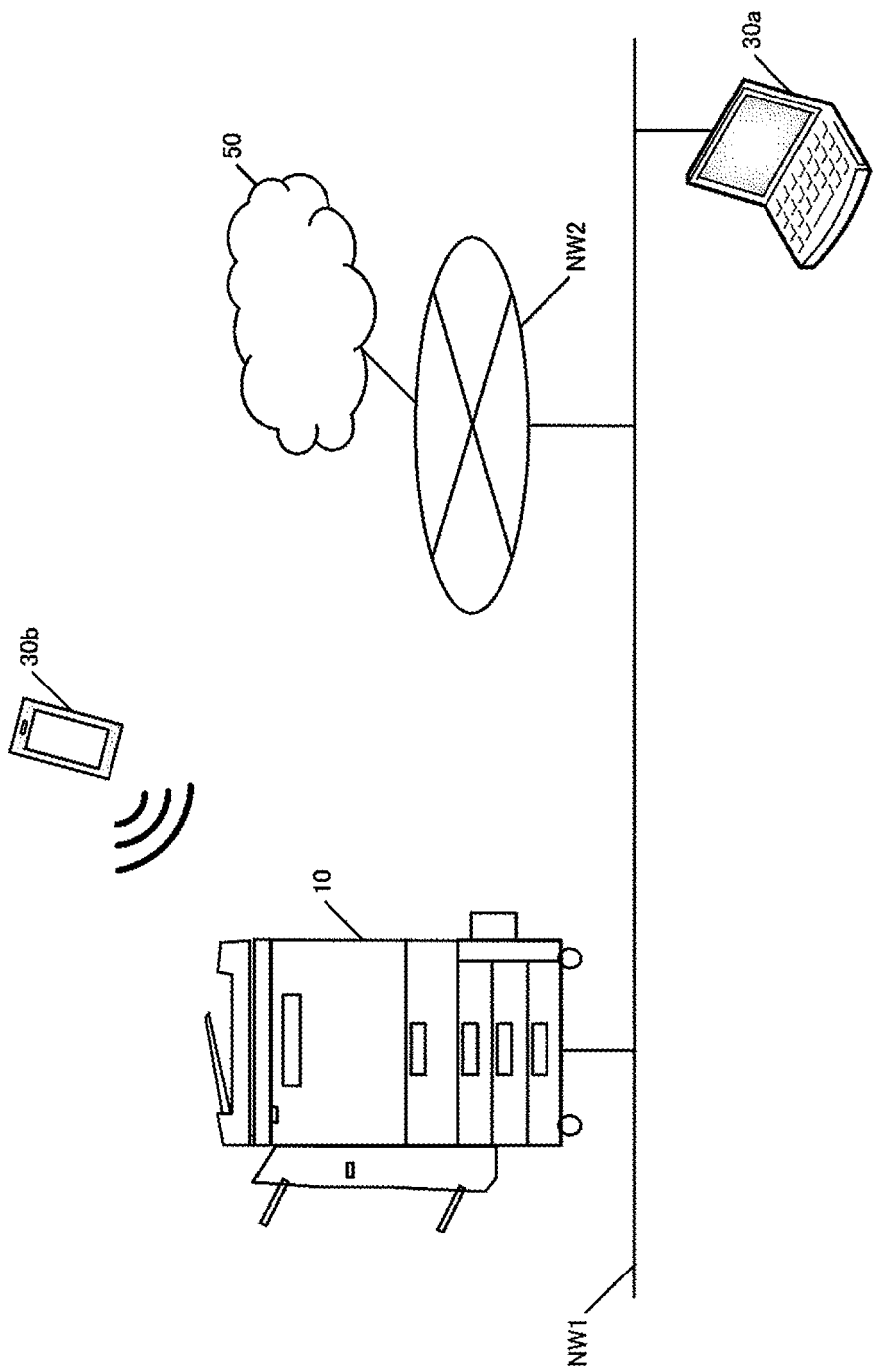
FIG. 1 is a schematic configuration diagram illustrating an example of a mode of connection of a multifunction peripheral according to a first embodiment.

Embodiments according to the present disclosure will be described below with reference to the drawings. Note that the following embodiments are examples for explaining the present disclosure, and the technical content in the explanation described in the claims is not limited to the following description.

In the case of using a related-art authentication method of performing authentication based on a user name (ID) and a password, information necessary for the authentication can be registered with the same procedure using either a setting screen for receiving input of authentication information on an image forming device or a web page screen obtained by reproducing the setting screen. Thus, there is no problem in that the setting screen on the image forming device and the web page screen display the same content.

However, in the case of an authentication method that requires prior authorization, there is a case in which authentication processing via a web page screen cannot be performed because of the processing flow. When the display content of the web page screen is the same as the display content of the setting screen on the image forming device even though the authentication processing cannot be executed, the user may be confused and feel inconvenienced.

It is known that when an information processing device is subjected to OAuth 2.0 authentication for an external service, the external service is caused to perform authorization processing in response to a request from the information processing device and the information processing device acquires an access token is acquired using an authorization code redirected from the external service.

However, in the related art, a case in which the authentication processing is requested from the web page screen (Web-UI) to the external service is not assumed.

In the present disclosure, the following embodiments each achieve an image forming device that can help prevent reduced user convenience when outputting a setting screen related to authentication processing even when using an authentication method that requires prior authorization.

1. First Embodiment

In a first embodiment, an image forming device includes an outputter that outputs, when an authentication method is capable of being set and an authentication method that requires prior authorization by an authorization service is selected, screen information of a setting screen corresponding to the authentication method that requires the prior authorization by the authorization service, and one or more controllers that control output of the screen information by the outputter. The one or more controllers perform control to determine a display content of the setting screen based on an output destination of the screen information and output the screen information including the display content. In the first embodiment, a multifunction peripheral that can perform jobs related to various operation modes such as printing, copying, faxing, and image transmission in one casing will be described as a mode of the image forming device.

FIG. 1 is a diagram illustrating an example of a mode of connection between external terminal devices 30 (30a and 30b) and an external service 50 with respect to a multifunction peripheral 10. In this example, the multifunction peripheral 10 is one mode of the image forming device according to the present disclosure. The multifunction peripheral 10 according to the present disclosure also functions as a server device configured to provide each external terminal device 30 with a setting screen related to job execution or device setting via a web application (Web-UI) using a communication protocol such as the hypertext transfer protocol (HTTP) or via a native application such as a cooperative application. In FIG. 1, the external terminal device 30a is an output destination to which screen information related to the setting screen is output via the web application, and the external terminal device 30b is an output destination to which the screen information related to the setting screen is output via the cooperative application. Note that the external terminal devices 30a and 30b can have substantially the same functional configuration. Thus, when it is unnecessary to distinguish between these devices, each external terminal device may be simply described as the external terminal device 30.

The external service 50 can be configured as a cloud server that executes an authorization code flow based on OAuth 2.0 authentication to authorize use of resources provided by the external service 50. The configuration of the external service 50 is not limited as long as the external service 50 is configured to generate an authorization code and an access token in accordance with whether authorization succeeds. For example, a device that processes the authorization code flow and a device that provides the resources may be separately provided. Note that the external service 50 is an example of an authorization service.

As illustrated in FIG. 1, the multifunction peripheral 10 is connected to the external terminal device 30a via a network NW1 and is further connected to the external service 50 via a network NW2. The network NW1 and the network NW2 each represent a network line such as a local area network (LAN), a wide area network (WAN), and the Internet. Note that the external service 50 may be connected to the network NW1 by using any mode of connection.

The multifunction peripheral 10 is configured to be communicable with the external terminal device 30b via a (near field) wireless communication technology such as Bluetooth (trade name), near field communication (NFC), Wi-Fi (trade name), ZigBee (trade name), IrDA, or wireless universal serial bus (USB).

1.1 Functional Configuration
1.1.1 Multifunction Peripheral 10

Figure 2:
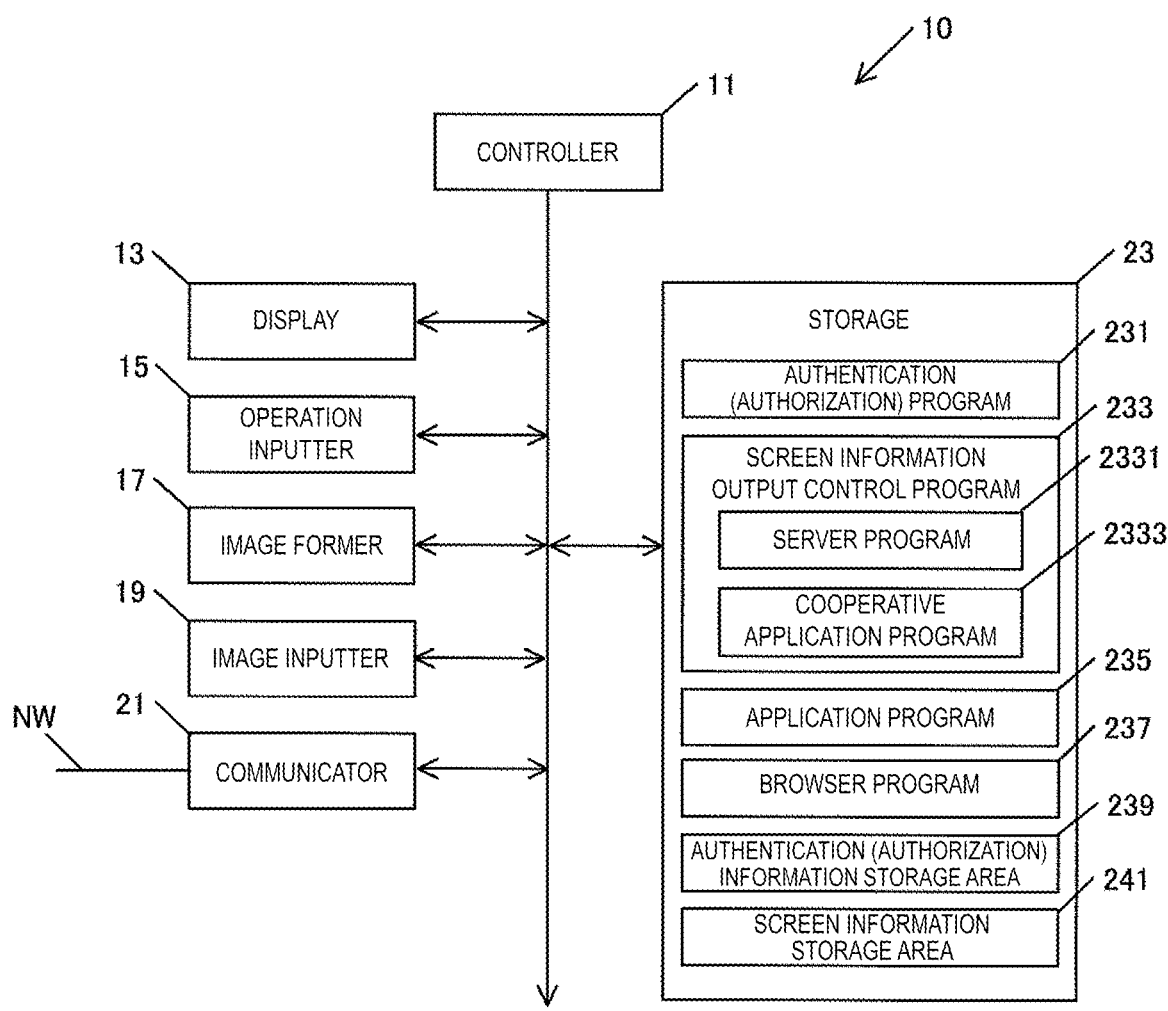
FIG. 2 is a diagram illustrating a functional configuration of the multifunction peripheral according to the first embodiment.

A functional configuration of the multifunction peripheral 10 according to the first embodiment will be described. FIG. 2 is a functional configuration diagram of the multifunction peripheral 10. The multifunction peripheral 10 includes a controller 11, a display 13, an operation inputter 15, an image former 17, an image inputter 19, a communicator 21, and a storage 23.

The controller 11 controls the entire multifunction peripheral 10. The controller 11 is configured of, for example, one or multiple arithmetic devices (central processing units (CPUs) or the like). The controller 11 performs its functions by reading out and executing various programs stored in the storage 23.

The display 13 is a display device that displays various types of information for the user or the like. The display 13 can be configured of, for example, a liquid crystal display (LCD), an organic electro-luminescence (EL) display, or the like. The display 13 functions as an outputter that displays a screen for browsing generated by a browser program 237 (described below) under control of the controller 11.

The operation inputter 15 receives an input of information by a user or the like. The operation inputter 15 can be configured of an input device such as hard keys (e.g., a numeric keypad) or buttons. The operation inputter 15 can be configured as a touch panel configured to accept input via the display 13. In this case, a general system such as a resistance film system, an infrared system, an electromagnetic induction system, or a capacitance system can be adopted as an input system of the touch panel.

The image former 17 forms an image based on image data on a sheet serving as a recording medium. The image former 17 feeds a sheet from a feed tray (not illustrated), forms an image based on image data on the sheet, and then discharges the sheet to a sheet discharger (not illustrated). The image former 17 can be configured of, for example, a laser printer using an electrophotographic system. In this case, the image former 17 performs image formation using toner supplied from toner cartridges (not illustrated) corresponding to toner colors (e.g., cyan, magenta, yellow, and black).

The image inputter 19 generates image data by scanning a document. The image inputter 19 can be configured as a scanner device including, for example, an image sensor such as a charge coupled device (CCD) or a contact image sensor (CIS), an automatic document feeder (ADF), and a flatbed on which a document is placed to be read. The configuration of the image inputter 19 is not particularly limited as long as the image inputter 19 is configured to generate image data by reading a reflected light image from a document image using the image sensor. Note that the image inputter 19 can be configured as an interface capable of acquiring, for example, image data stored in a portable storage medium such as a USB memory stick and image data transmitted from an external terminal device.

The communicator 21 includes, for example, one or both of wired and wireless interfaces for communicating with other devices (e.g., the external terminal device 30 and the external service 50) via a network (NW) such as a LAN, a WAN, the Internet, a telephone line, or a fax line. The communicator 21 functions as an outputter that outputs, to the external terminal device 30, screen information related to a setting screen under control of the controller 11.

The storage 23 stores various programs and various types of data necessary for the operation of the multifunction peripheral 10. The storage 23 may or example, be configured of a storage device such as a random access memory (RAM), a hard disk drive (HDD), a solid state drive (SSD), or a read only memory (ROM).

In the first embodiment, the storage 23 stores an authentication (authorization) program 231, a screen information output control program 233, an application program 235, and a browser program 237. The storage 23 includes an authentication (authorization) information storage area 239 and a screen information storage area 241.

The authentication (authorization) program 231 is a program read out by the controller 11 when authentication (authorization) processing is to be performed between the multifunction peripheral 10 and the external service 50. After reading out the authentication (authorization) program 231, the controller 11 can cooperate with the external service 50, present an authorization code or an access token issued by the external service 50, and request resources of the external service 50. Note that, after reading out the authentication (authorization) program 231, the controller 11 can perform authentication (processing) using a related-art authentication method of performing authentication based on a user name (ID) and a password, in addition to an authentication method that requires prior authorization, such as OAuth 2.0 authentication.

The screen information output control program 233 is a program read out by the controller 11 when the controller 11 is to control output of screen information for display on the display 13 or transmission at the communicator 21. After reading out the screen information output control program 233, the controller 11 functions as a controller that controls output of the screen information and determines the display content of the setting screen in accordance with the output destination of the screen information. Specifically, in a case where the controller 11 determines that the output destination of the screen information is the display device (the display 13) included in the multifunction peripheral 10, the controller 11 determines that the screen information to be output is first screen information having a display content of accepting execution of the authentication processing. On the other hand, in a case where the controller 11 determines that the output destination of the screen information is the external terminal device 30, the controller 11 determines that the screen information to be output is second screen information having a display content of restricting execution of the authentication processing.

The screen information output control program 233 can also include a server program 2331 and a cooperative application program 2333 for controlling output of the screen information having the determined display content. The server program 2331 is a program read out by the controller 11 when the controller 11 is to provide the screen information in response to a request from a browser. After reading out the server program 2331, the controller 11 can implement a server function of outputting the screen information in response to, for example, a request from a browser of the external terminal device 30a or a browser of the multifunction peripheral 10. The cooperative application program 2333 is a program read out by the controller 11 when the controller 11 is to operate in cooperation with the external terminal device 30b. After reading the cooperative application program 2333, the controller 11 can output the screen information in response to a screen information request from the external terminal device 30b, which is a cooperation destination, in a series of cooperative operations with the external terminal device 30b.

The application program 235 is an application that functions using a resource provided by the external service 50. The application program 235 may be an integrated management application that controls settings, management, and the like of the multifunction peripheral 10, or may be an individual application (e.g., an image transmitting application) that uses the integrated management application as a platform.

The browser program 237 is a program read out by the controller 11 when the controller 11 is to render the screen information and display a screen for browsing on the display 13. The authentication (authorization) information storage area 239 is a storage area that stores authentication (authorization) information related to the authentication (authorization) processing. The authentication (authorization) information storage area 239 stores, for example, authentication information such as a name (provider name) of the external service 50 associated with the authentication method and an account name for the external service 50.

The screen information storage area 241 is a storage area that stores the screen information related to the setting screen to be displayed on the display 13 and the setting screen to be displayed on the external terminal device 30. The screen configuration for browsing based on the screen information stored in the screen information storage area 241 will be described below.

1.1.2 External Terminal Device 30

Figure 3:
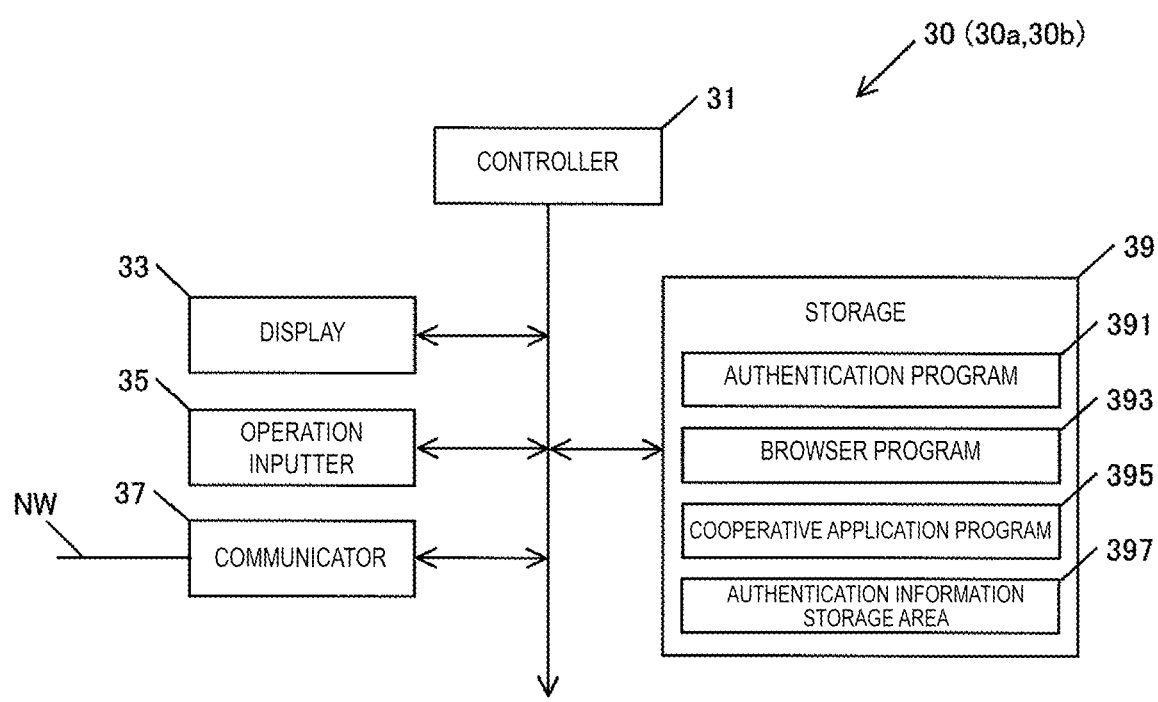
FIG. 3 is a diagram illustrating a functional configuration of an external terminal device according to the first embodiment.

Next, a functional configuration of the external terminal device 30 will be described. FIG. 3 is a functional configuration diagram of the external terminal device 30 (30a or 30b). Note that the external terminal devices 30a and 30b can have the same configuration except that the external terminal device 30b includes a cooperative application program 395. Thus, the external terminal devices 30a and 30b are simply described as the external terminal device 30 without being distinguished from each other.

The external terminal device 30 includes a controller 31, a display 33, an operation inputter 35, a communicator 37, and a storage 39.

The controller 31 controls the entire external terminal device 30. The controller 31 is configured of, for example, one or multiple arithmetic devices (such as CPUs). The controller 31 performs its functions by executing various programs stored in the storage 39.

The display 33 is a display device that displays various types of information to the user or the like. The display 33 can be configured of, for example, an LCD or an organic EL display. The display 33 displays a screen for browsing generated from screen information acquired from the multifunction peripheral 10 under control of the controller 31.

The operation inputter 35 receives input of information input by the user or the like. The operation inputter 35 can be configured of an input device such as a keyboard, a mouse, or a numeric keypad. Note that the operation inputter 35 can be configured as a touch panel that allows input via the display 33. In this case, a general system such as a resistance film system, an infrared system, an electromagnetic induction system, or a capacitance system can be used as an input system of the touch panel.

The communicator 37 includes, for example, one or both of wired and wireless interfaces for communicating with other devices (e.g., the multifunction peripheral 10) via a network (NW) such as a LAN, a WAN, the Internet, a telephone line, or a fax line.

The storage 39 stores various programs and various types of data necessary for operation of the external terminal device 30. The storage 39 can be configured of a storage device such as a RAM, an HDD, an SSD, or a ROM.

In the first embodiment, the storage 39 stores an authentication program 391, a browser program 393, and a cooperative application program 395. The storage 39 includes an authentication information storage area 397.

The authentication program 391 is a program read out by the controller 31 when the controller 31 is to perform authentication processing between the external terminal device 30 and the external service 50. After reading out the authentication program 391, the controller 31 can perform authentication (processing) using a related-art authentication method of performing authentication based on a user name (ID) and a password.

The browser program 393 is a program read out by the controller 31 when the controller 31 is to render screen information for screen display and display a screen for browsing on the display 33. After reading out the browser program 393, the controller 31 can generate the screen for browsing by rendering the screen information acquired via the server function provided by the multifunction peripheral 10 and cause the display 33 to display the screen for browsing as a Web-UI.

The cooperative application program 395 is a program read out by the controller 31 when the controller 31 is to operate in cooperation with the multifunction peripheral 10. After reading out the cooperative application program 395, the controller 31 transmits and receives a command including the screen information and the like transmitted from the multifunction peripheral 10. Here, "cooperation" means that at least two devices cooperate with each other while sharing information to obtain one result. The external terminal device 30 can cooperate with the multifunction peripheral 10 by causing the display 33 to display the screen based on the screen information acquired from the multifunction peripheral 10.

The authentication information storage area 397 is a storage area storing authentication information related to the authentication processing, and stores authentication information such as a name (provider name) of the external service 50 associated with the authentication method, an account name (user name (ID)) for the external service 50, and a password.

1.1.3 External Service 50

The external service 50 employs OAuth 2.0 authentication as the authentication method, and a known configuration can be used as long as the external service 50 can provide services such as email delivery and data sharing (storage). Thus, description of the functional configuration of the external service 50 will be omitted.

1.2 Processing Flow

Figure 4:
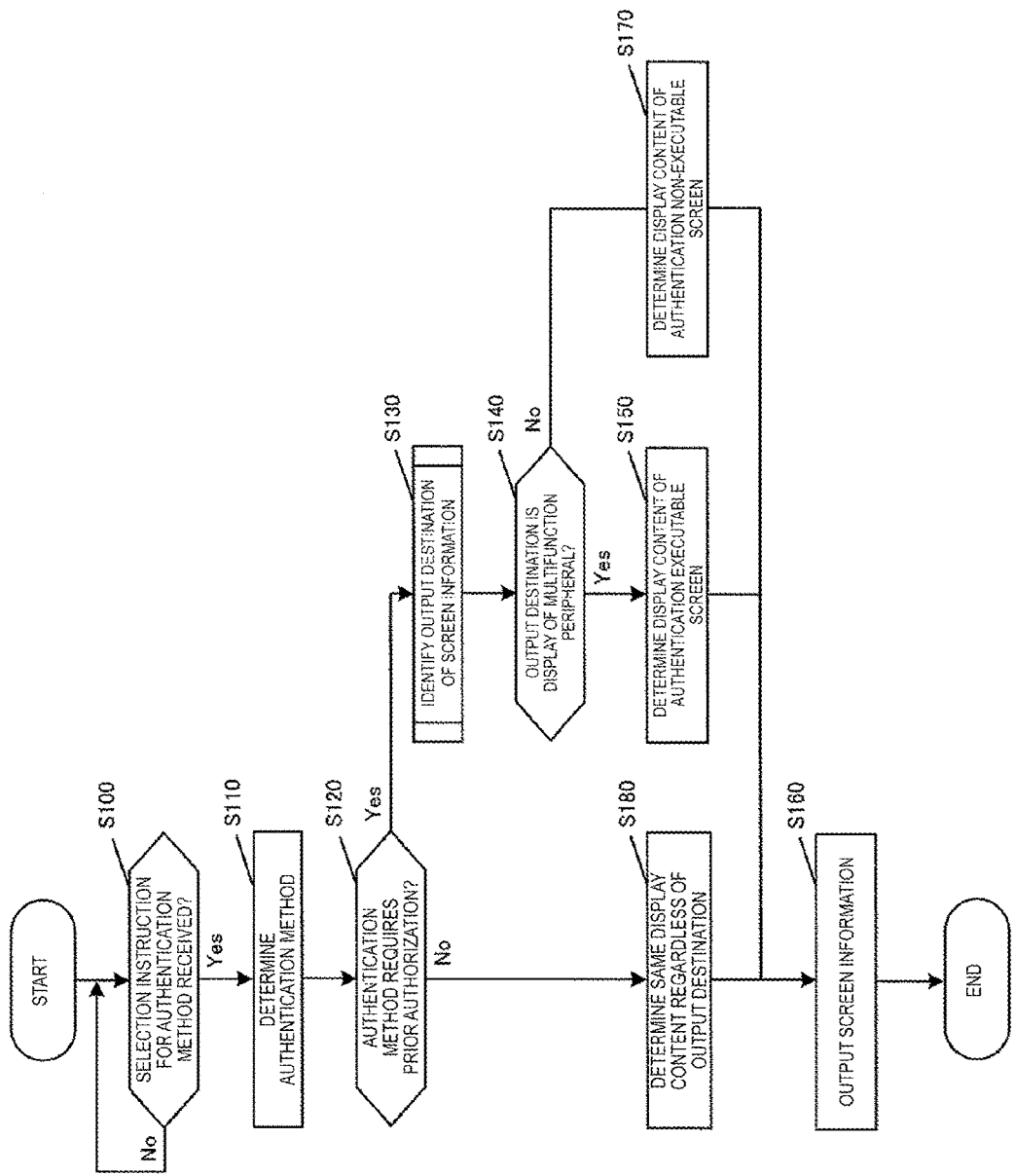
FIG. 4 is a flowchart illustrating a processing flow according to the first embodiment.

Next, a processing flow according to the first embodiment will be described. FIG. 4 is a flowchart illustrating processing of determining a display content of a setting screen in accordance with an output destination of screen information, and outputting the screen information in a state of applying an authentication method that requires prior authorization by an authorization service. The controller 11 executes the processing described below by mainly reading out programs such as the authentication (authorization) program 231, the screen information output control program 233, the application program 235, and the browser program 237. In the explanation with reference to FIG. 4, the display 13 of the multifunction peripheral 10 and the external terminal device 30a capable of displaying the setting screen of the multifunction peripheral 10 via the Web-UI will be described as examples of output destinations of the screen information. However, the present disclosure can also be applied to the external terminal device 30b that acquires the screen information related to the setting screen of the multifunction peripheral 10 via the cooperative application.

First, the controller 11 determines whether a selection instruction for an authentication method has been received from the user (step S100). In a case where the selection instruction for the authentication method has been received, the controller 11 determines which authentication method is the selected authentication method (Yes in step S100 and proceeding to step S110). On the other hand, in a case where it is determined that the selection instruction for the authentication method has not been received, the controller 11 waits to receive the selection instruction for the authentication method (No in step S100).

The controller 11 determines whether the determined authentication method is an authentication method that requires prior authorization (step S120). In a case where the determined authentication method is an authentication method that requires prior authorization, the controller 11 identifies an output destination of the screen information (Yes in step S120 and proceeding to step S130).

In the present disclosure, in a case where the determined authentication method is an authentication method that requires prior authorization such as OAuth 2.0 authentication, the processing branches based on whether the output destination of the screen information is the multifunction peripheral 10 that can be subjected to prior authorization to use resources and that can acquire a redirection from the external service 50, or the external terminal device 30a that cannot be subjected to prior authorization to use resources and that cannot acquire a redirection from the external service 50.

The controller 11 determines whether the identified output destination of the screen information is the display 13 of the multifunction peripheral 10 (step S140). In a case where it is determined that the identified output destination of the screen information is the display 13 of the multifunction peripheral 10, the controller 11 determines that the screen information has a display content of a screen that enables execution of the authentication processing (authentication executable screen) (Yes in step S140 and proceeding to step S150). Then, the controller 11 outputs the screen information to the display 13 via the browser program 237 and ends the processing (step S160).

On the other hand, in a case where it is determined that the identified output destination of the screen information is not the display 13 of the multifunction peripheral 10, that is, in a case where it is determined that the output destination of the screen information is the external terminal device 30a via the Web-UI, the controller 11 determines that the screen information has a display content of a screen that disables execution of the authentication processing (authentication non-executable screen) (No in Step S140 and proceeding to Step S170). Then, the controller 11 outputs the screen information to the external terminal device 30a via the communicator 21 and ends the processing (step S160).

Here, in a case where the determined authentication method is not the authentication method that requires prior authorization in step S120, the controller 11 determines that the screen information has the same display content regardless of the output destination (No in Step S120 and proceeding to Step S180). Then, the controller 11 outputs the screen information to either the display 13 or the external terminal device 30a and ends the processing (step S160).

Next, the processing of identifying the output destination of the screen information in step S130 of FIG. 4 will be described with reference to the flowchart of FIG. 5.

When the processing of identifying the output destination of the screen information starts, the controller 11 acquires identification information (e.g., IP address) of the output destination (device) of the screen information on the network as information for identifying the output destination of the screen information (step S1310).

Subsequently, the controller 11 determines whether the acquired output destination of the screen information is the display 13 (local) of the multifunction peripheral 10 (step S1320). At this time, the controller 11 can determine whether the output destination of the screen information is the display 13 of the multifunction peripheral 10 with reference to an output destination management table 250.

The output destination management table 250 will now be described. FIG. 6 is a diagram showing a data configuration example of the output destination management table 250. The output destination management table 250 includes management items of "output destination", "identification information (IP address)", and "output screen information".

The middle row of the output destination management table 250 is an example of management when the "output destination" is "local", the "identification information (IP address)" is "192.168.1.aa", and the "output screen information" is "authentication executable screen (corresponding to the first screen information)". The bottom row of the output destination management table 250 is an example of management when the "output destination" is "external terminal device", the "identification information (IP address)" is "IP address other than 192.168.1.aa", and the "output screen information" is "authentication non-executable screen (corresponding to the second screen information)".

Figure 5:
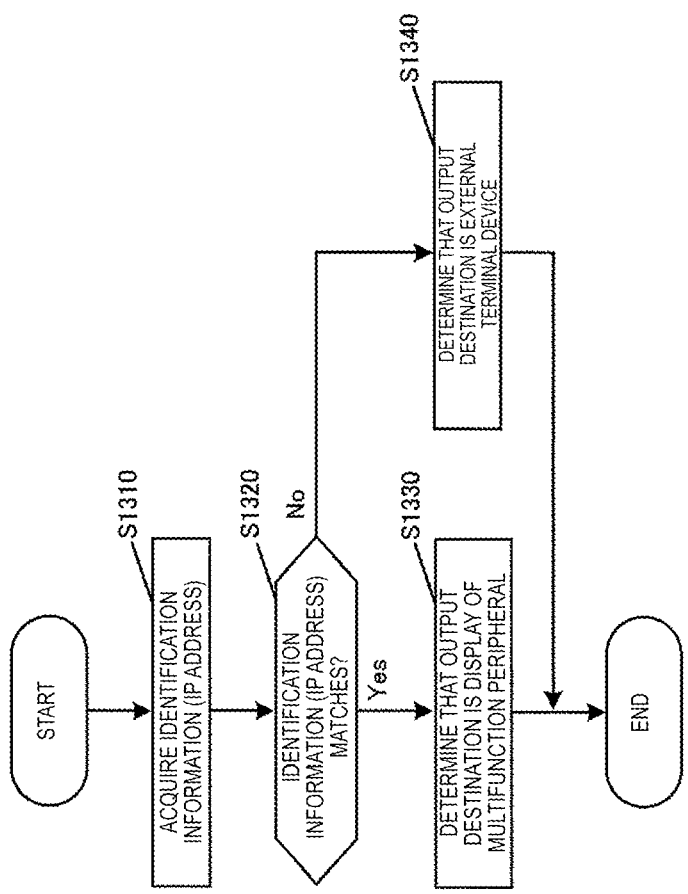
FIG. 5 is a flowchart illustrating a processing flow according to the first embodiment.

When identifying the output destination of the screen information in step S1320 of FIG. 5, the controller 11 compares the IP address acquired in step S1310 with the IP address of the "identification information (IP address)", which has the "output destination" of "local" managed in the output destination management table 250 of FIG. 6. Thus, the controller 11 can identify the output destination of the screen information and the screen information (output screen information) to be output to the output destination.

Returning to FIG. 5, in a case where the IP address acquired in step S1310 matches the IP address of the "identification information (IP address)" which has the "output destination" of "local" managed in the output destination management table 250, the controller 11 determines that the output destination of the screen information is the display 13 of the multifunction peripheral 10 and ends the processing (Yes in step S1320 and proceeding to step S1330). On the other hand, in a case where the IP address acquired in step S1310 does not match the IP address of the "identification information (IP address)" which has the "output destination" of "local", the controller 11 determines that the output destination of the screen information is the external terminal device 30 and ends the processing (No in step S1320 and proceeding to step S1340).

1.3 Operation Example

Next, an operation example according to the first embodiment will be described. FIG. 7 is a diagram illustrating a configuration example of a simple mail transfer protocol (SMTP) setting screen W10 before receiving a selection instruction for an authentication method from the user.

The SMTP setting screen W10 includes an SMTP setting region R10 and an authentication setting region R20. The SMTP setting region R10 includes various input boxes such as a "primary server" input box, a "secondary server" input box, a "port number" input box, a "timeout" input box, a "sender name" input box, a "sender address" input box, and an "enable SSL/TLS" check box. The SMTP setting region R10 is a region for receiving input of email settings when the external service 50 is an email server.

The authentication setting region R20 includes an authentication method selection pull-down menu P10 for receiving selection of the authentication method, an authentication destination selection pull-down menu P12 for receiving selection of an external service name (provider name) of the authentication destination, and an account name input box Bx10 for receiving input of an account name for the authentication destination. The authentication setting region R20 is a region for receiving input of authentication information necessary for the external service 50 to execute the authentication processing. When the user selects OAuth 2.0 authentication as the authentication method and the output destination of the SMTP setting screen W10 is the display 13 of the multifunction peripheral 10, the authentication processing for the external service 50 can be executed.

FIG. 8 is a diagram illustrating a selection operation of the authentication method in the authentication method selection pull-down menu P10 of the authentication setting region R20 in FIG. 7. For example, when the user selects an arrow portion or the like of the authentication method selection pull-down menu P10, the display region of the authentication method selection pull-down menu P10 is expanded downward, and a list of selectable authentication methods is displayed. In this state, the user can select a desired authentication method.

When the user selects OAuth 2.0 authentication as the authentication method, the selection of the authentication method acts as a trigger to cause the controller 11 to execute the processing from step S100 in FIG. 4. In a case where it is determined that the output destination of the SMTP setting screen W10 is the display 13 of the multifunction peripheral 10, the controller 11 displays, on the display 13 of the multifunction peripheral 10, an SMTP setting screen W20 as the authentication executable screen illustrated in FIG. 9.

The SMTP setting screen W20 includes a connection button B10 for receiving an execution instruction for the authentication processing in the external service 50. When receiving a selection instruction from the user via the connection button B10, the controller 11 transmits an authorization request to an authorization endpoint of the external service 50 and causes the external service 50 to start the authentication processing.

On the other hand, FIG. 10 is a diagram illustrating a configuration example of an SMTP setting screen W30 as the authentication non-executable screen. The SMTP setting screen W30 is the authentication non-executable screen displayed on the display 33 of the external terminal device 30 in a case where the controller 11 determines that the output destination of the SMTP setting screen W10 is not the display 13 of the multifunction peripheral 10 (No in step S140 in FIG. 4).

Unlike the SMTP setting screen W20 illustrated in FIG. 9, the SMTP setting screen W30 displays, in the authentication setting region R20, a message screen M10 for prompting execution of the authentication processing via the SMTP setting screen W20 serving as the authentication executable screen, instead of the connection button B10. By checking the display content of the message screen M10, the user can recognize that the authentication processing via the SMTP setting screen W30 cannot be executed. In this case, the user needs to input an execution instruction for the authentication processing via the SMTP setting screen W20 serving as the authentication executable screen displayed on the display 13 of the multifunction peripheral 10.

The controller 11 does not receive input of the execution instruction for the authentication processing via the SMTP setting screen W30 serving as the authentication non-executable screen. However, the controller 11 can receive operation instructions such as registration/change/deletion of the authentication information or deletion of an acquired access token (not illustrated) via the authentication setting region R20 and store the received authentication information or the like in the authentication (authorization) information storage area 239.

The authentication information or the like stored in the authentication (authorization) information storage area 239 can be reflected and displayed on the SMTP setting screen W20 serving as the authentication executable screen. With such a configuration, the user can input the execution instruction for the authentication processing via the display 13 (the SMTP setting screen W20) of the multifunction peripheral 10 while checking the input content at the external terminal device 30.

As described above, according to the first embodiment, selection of the authentication method that requires prior authorization can be used as a trigger to output the screen information that has the display content of either the screen that enables execution of the authentication processing (authentication executable screen) or the screen that disables execution of the authentication processing (authentication non-executable screen), in accordance with the output destination of the screen information. Additionally, a message for prompting execution of the authentication processing via the authentication executable screen can be displayed on the authentication non-executable screen. This configuration can also help prevent reduced user convenience, even in an environment in which the multifunction peripheral is operated via a web page screen (Web-UI) or the like that cannot be subjected to authorization to use resources in advance, for example.

2. Second Embodiment

In a second embodiment, in a case where operation via the display of the external terminal device is interrupted and then the user who has interrupted the operation logs into the multifunction peripheral, a message asking whether to continue the operation is displayed on the display of the multifunction peripheral.

2.1 Functional Configuration

Figure 11:
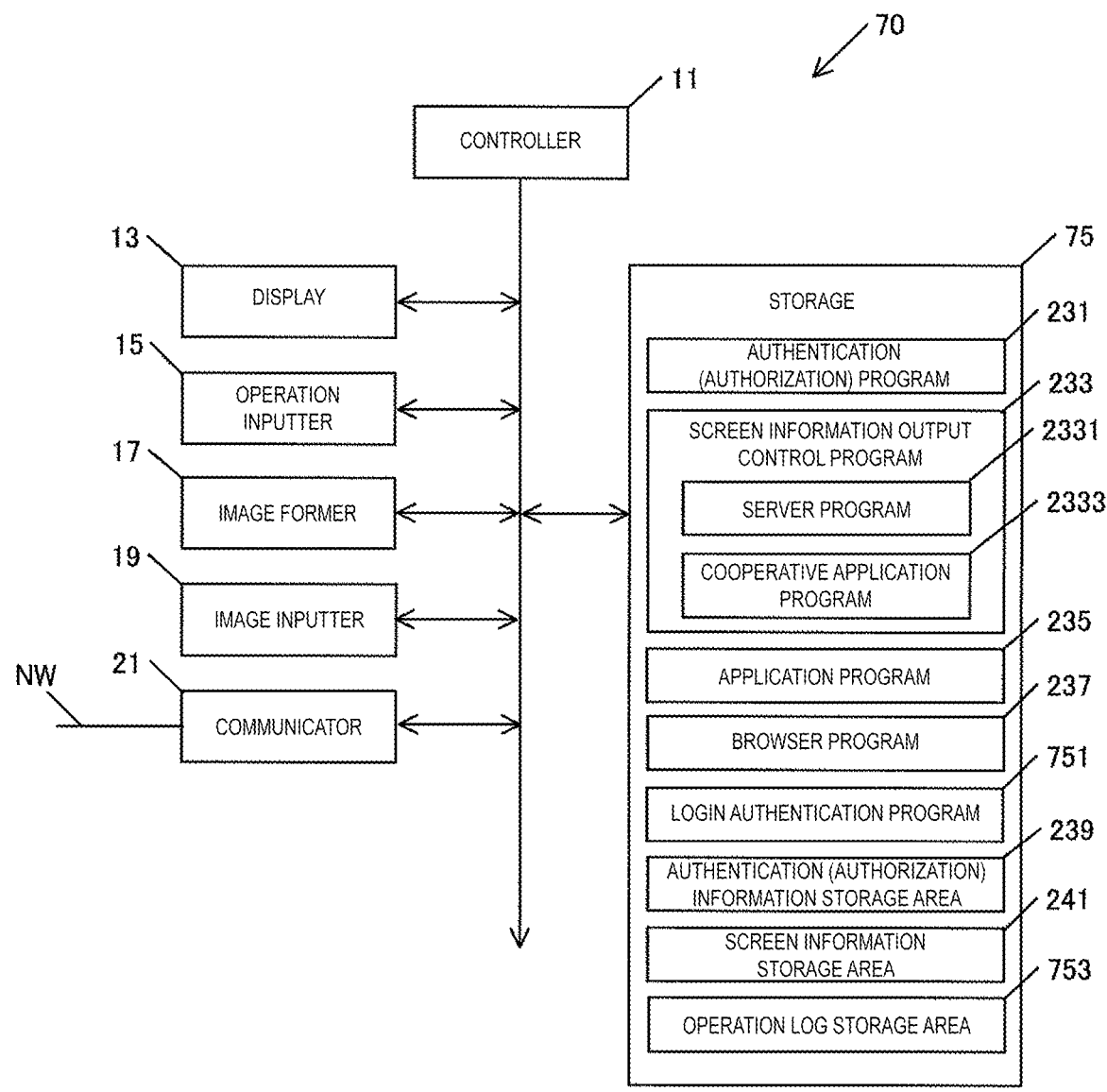
FIG. 11 is a diagram illustrating a functional configuration of a multifunction peripheral according to a second embodiment.

FIG. 11 is a functional configuration diagram illustrating a functional configuration of a multifunction peripheral 70 according to the second embodiment. The multifunction peripheral 70 can have substantially the same functional configuration as the multifunction peripheral 10 according to the first embodiment. Thus, components having the same configurations are denoted by the same reference signs, and description thereof may be omitted.

The multifunction peripheral 70 includes a controller 11, a display 13, an operation inputter 15, an image former 17, an image inputter 19, a communicator 21, and a storage 75 instead of the storage 23.

In the second embodiment, the storage 75 stores an authentication (authorization) program 231, a screen information output control program 233, an application program 235, a browser program 237, and a login authentication program 751. The storage 75 includes an authentication (authorization) information storage area 239, a screen information storage area 241, and an operation log storage area 753.

The login authentication program 751 is a program read out by the controller 11 when the controller 11 is to authenticate a user who attempts to log into the multifunction peripheral 70. In a case where a user authentication function is enabled, after reading out the login authentication program 751, the controller 11 causes the display 13 to display a login screen and receives input of authentication information related to the user authentication. For example, in a case where the authentication condition is a combination of a login user name and a login password, the controller 11 can perform user authentication by storing login user names and login passwords related to the user authentication in association with each other in advance and checking the login user name and the login password input via the login screen against the stored login user names and login passwords. Note that the user authentication may be, for example, possession-based authentication using a token, a key, an integrated circuit (IC) card, or a smartphone, or biometric authentication such as face authentication or fingerprint authentication, in addition to knowledge-based authentication combining a login user name and a login password. Note that the controller 11 can receive setting of enabling/disabling the user authentication function via a system setting screen (not illustrated) or the like.

The operation log storage area 753 is a storage area that stores, as operation logs, operations such as registration/change/deletion of the authentication information and deletion of an acquired access token (not illustrated) that are performed on the authentication executable screen or the authentication non-executable screen.

In the second embodiment, the external terminal device 30 (30a, 30b) and the external service 50 can have substantially the same functional configurations as those of the first embodiment, and thus description thereof will be omitted.

2.2 Processing Flow

Next, a processing flow according to the second embodiment will be described with reference to the flowchart illustrated in FIG. 12. The controller 11 executes the processing described below by mainly reading out programs such as the authentication (authorization) program 231, the screen information output control program 233, the application program 235, the browser program 237, and the login authentication program 751. First, the controller 11 determines whether the user performs an operation via the authentication non-executable screen (step S200).

In a case where it is determined that the operation is performed via the authentication non-executable screen, the controller 11 monitors a status of operation by the user and determines whether the operation has been interrupted (Yes in step S200 and proceeding to step S210). Note that in a case where it is determined that no operation is performed via the authentication non-executable screen, the controller 11 waits for an operation to be performed (No in step S200).

In a case where it is determined that the operation via the authentication non-executable screen has been interrupted, the controller 11 stores the operation at the time of interruption as an operation log (Yes in step S210 and proceeding to step S220). On the other hand, in a case where it is determined that the operation via the authentication non-executable screen has not been interrupted, the controller 11 waits until the operation is interrupted (No in step S210). Note that when the operation by the user has not been interrupted in step S210, it is also possible to omit the processing described in and after step S220. In this case, the controller 11 can also store, in the authentication (authorization) information storage area 239, authentication information received via the authentication non-executable screen and display the authentication executable screen reflecting the authentication information when the target user has logged into the multifunction peripheral 10. Additionally, a clock such as a timer may be separately provided, and in a case where it is determined that a predetermined time has elapsed since the interruption of the operation by the user, the processing in and after step S220 may be executed.

Subsequently, the controller 11 determines whether the user (target user) who has interrupted the operation is logged into the multifunction peripheral 70 (step S230). In a case where the login name (ID) of the user who logs into the multifunction peripheral 70 is the same as the login name (ID) of the target user with respect to the external terminal device 30, the login name (ID) of the target user is stored together with the operation log stored in step S220, and whether the target user is logged into the multifunction peripheral 70 can be determined with reference to the operation log at the time of login processing. In a case where the login name (ID) of the user who logs into the multifunction peripheral 70 is not the same as the login name (ID) of the target user with respect to the external terminal device 30, a table or the like in which the login name (ID) of the target user is associated with the login name (ID) with respect to the multifunction peripheral 70 is separately prepared to determine whether the target user is logged in to the multifunction peripheral 70.

In a case where it is determined that the target user is logged into the multifunction peripheral 70, the controller 11 displays, on the display 13, an operation continuation message asking whether to continue the interrupted operation (Yes in step S230 and proceeding to step S240). In a case where it is determined that the target user is not logged into the multifunction peripheral 70, the controller 11 waits until the target user logs into the multifunction peripheral 70 (No in step S230).

In a case of receiving an instruction to continue the operation from the user in response to display of the operation continuation message, the controller 11 displays the authentication executable screen on the display 13 and ends the processing (Yes in step S250 and proceeding to step S260). On the other hand, in a case of not receiving the instruction to continue the operation from the user, the controller 11 ends the processing (No in step S250).

2.3 Operation Example

Figure 13:
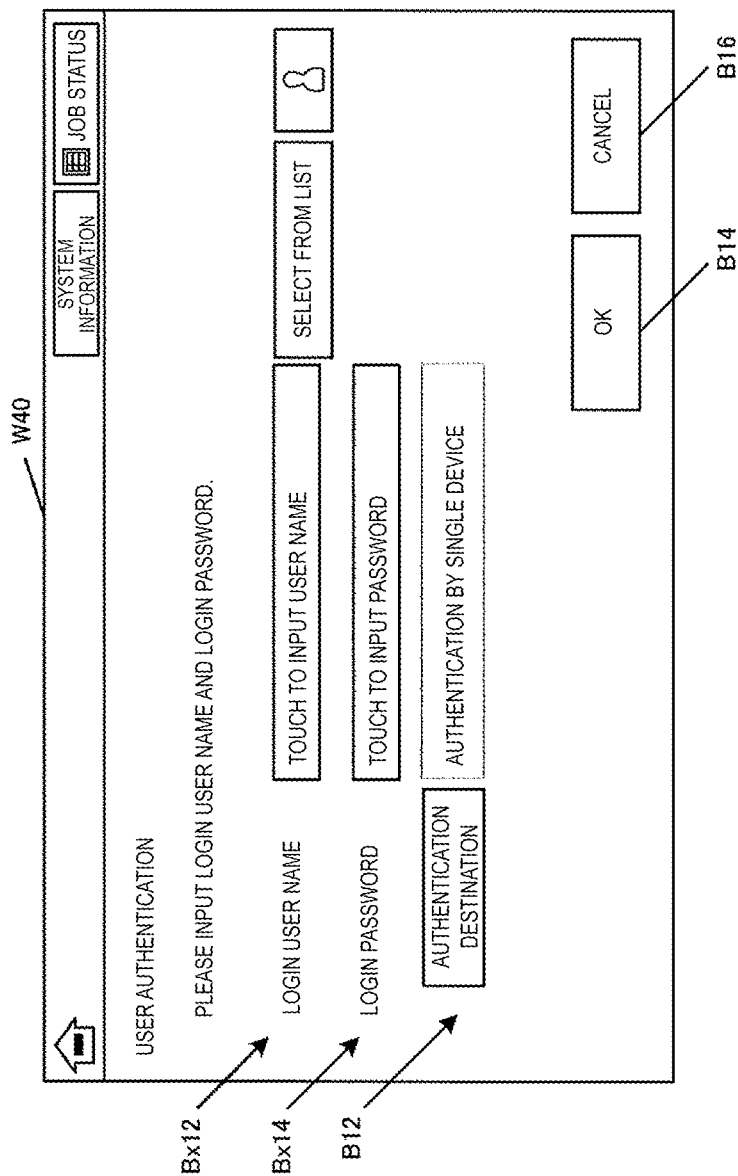
FIG. 13 is a diagram illustrating an operation example according to the second embodiment.

Next, an operation example according to the second embodiment will be described. FIG. 13 is a diagram illustrating a configuration example of a user authentication screen W40 displayed on the display 13 by the controller 11. In a case where the user authentication function is enabled, the user authentication screen W40 can be configured as a login screen to be displayed on the display 13 by the controller 11 after the controller 11 reads out the login authentication program 751.

The user authentication screen W40 includes a login user name input box Bx12, a login password input box Bx14, an authentication destination designation button B12, an "OK" button B14, and a "cancel" button B16.

The login user name input box Bx12 receives input of a login user name of a user attempting to log into the multifunction peripheral 70. Note that the login user name may be directly input using an input device such as a keyboard or may be input by being selected from a separately provided user name list displayed by pressing a selection button.

The login password input box Bx14 is an input box for receiving input of a login password corresponding to the login user name. The user attempting to log into the multifunction peripheral 70 inputs the login password together with the login user name.

The authentication destination designation button B12 is a button for receiving designation of a user authentication destination. The user authentication destination may be a single device or may be, for example, a login authentication server or the like separately provided on the network NW. In a case where a single device is designated as the user authentication destination, the controller 11 performs user authentication by comparing the input login user name and login password with user authentication information prepared in advance (e.g., a combination of a user name and a password). On the other hand, in a case where the login authentication server provided on the network NW is designated as the user authentication destination, the controller 11 performs user authentication by transmitting the input login user name and login password to the login authentication server and receiving an authentication result from the authentication server.

The "OK" button B14 is a button for receiving input of an instruction to finalize the input operation by the user. The user selects the "OK" button B14 to finalize the input to the login user name input box Bx12 and the login password input box Bx14 and the designation of the user authentication destination via the authentication destination designation button B12. The "cancel" button B16 is a button for receiving an instruction to cancel the input operation by the user.

Figure 14:
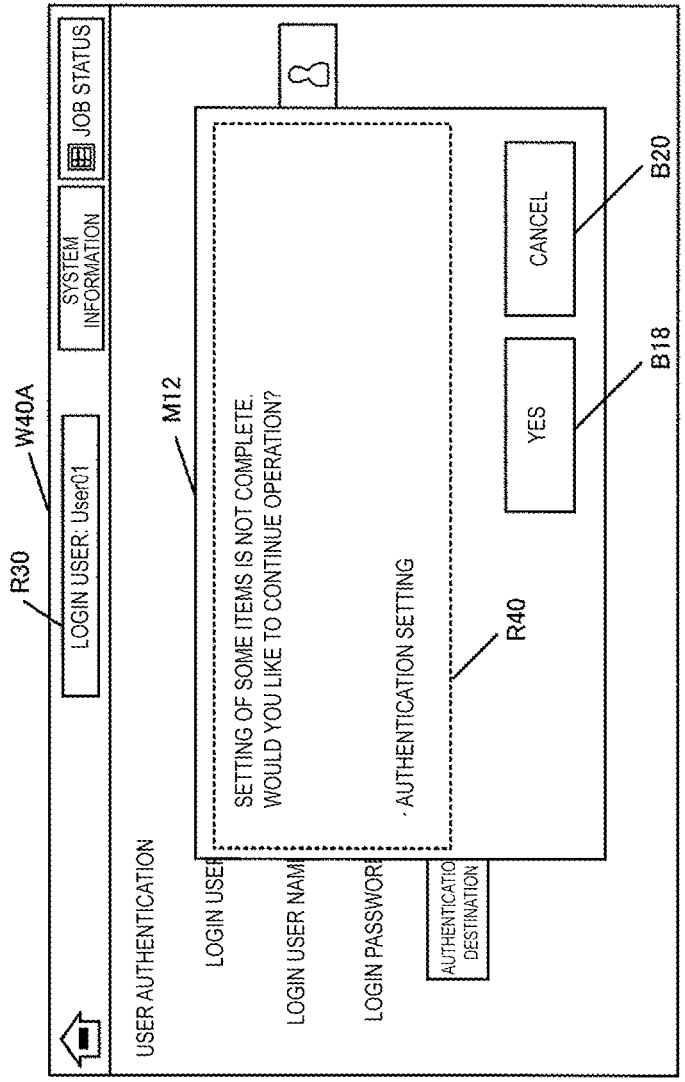
FIG. 14 is a diagram illustrating an operation example according to the second embodiment.

FIG. 14 is a diagram illustrating a configuration example of a message screen M12 displayed on a user authentication screen W40A by the controller 11 in a case where the target user has successfully logged into the multifunction peripheral 70. Note that FIG. 14 is an example in which the message screen M12 displaying an operation continuation message asking whether to continue the interrupted operation is superimposed on the user authentication screen W40A in which the login name (e.g., User01) of the target user who successfully logged in is displayed in a login user name display region R30.

The message screen M12 includes a message display region R40, a "yes" button B18, and a "cancel" button B20. The message display region R40 is a display region displaying content for asking the target user whether to resume and continue the interrupted operation (e.g., "Setting of some items is complete. Would you like to continue the operation?") and the content of the interrupted operation (" Authentication setting"). The "yes" button B18 is a button for receiving a selection instruction to continue the operation from the user. The "cancel" button B20 is a button for receiving a selection instruction not to continue the operation from the user. When the user checks the message content displayed in the message display region R40 and then selects the "yes" button B18, the user can resume and continue, at the multifunction peripheral 70, the operation interrupted at the external terminal device 30.

FIG. 15 is a diagram illustrating a configuration example of an SMTP setting screen W50 serving as the authentication executable screen displayed upon selection of the "yes"

button B18 by the user on the message screen M12. Note that FIG. 15 illustrates an example in which the operation is interrupted while the account name input box Bx10 in the authentication setting region R20 is blank or the account name is being input. In this case, for example, as illustrated in FIG. 15, an appropriate character for concealing information such as an asterisk "*" is added to the account name input box Bx10, whereby it is possible to express that the operation is interrupted and to prompt the user to continue input of the authentication information. For example, the interruption of the operation may be expressed not only by addition of the character for concealing information but also by the following methods. For example, the display font, display color, display size and the like of the characters or the input box related to the interrupted portion can be given a different display from other portions, the display pattern of the interrupted portion can be given a different display from other portions (e.g., blinking display in a specific pattern), or a symbol or the like (character, sign, or mark) that attracts user attention, such as an exclamation mark, can be added to the interrupted portion.

As described above, according to the second embodiment, in addition to the effects of the first embodiment, even when the operation performed via the external terminal device such as the Web-UI is interrupted, it is possible to resume and continue the interrupted operation when the user who has interrupted the operation logs into the multifunction peripheral. This can further enhance user convenience.

3. Third Embodiment

In a third embodiment, after completion of the input of the authentication information via the authentication non-executable screen, the operation is interrupted (ends) without the authentication processing at the external service being executed in the configuration of the second embodiment.

3.1 Functional Configuration

A multifunction peripheral 70, an external terminal device 30, and an external service 50 according to the third embodiment can have substantially the same functional configurations as those of the second embodiment, and thus description thereof will be omitted.

3.2 Processing Flow

Figure 12:
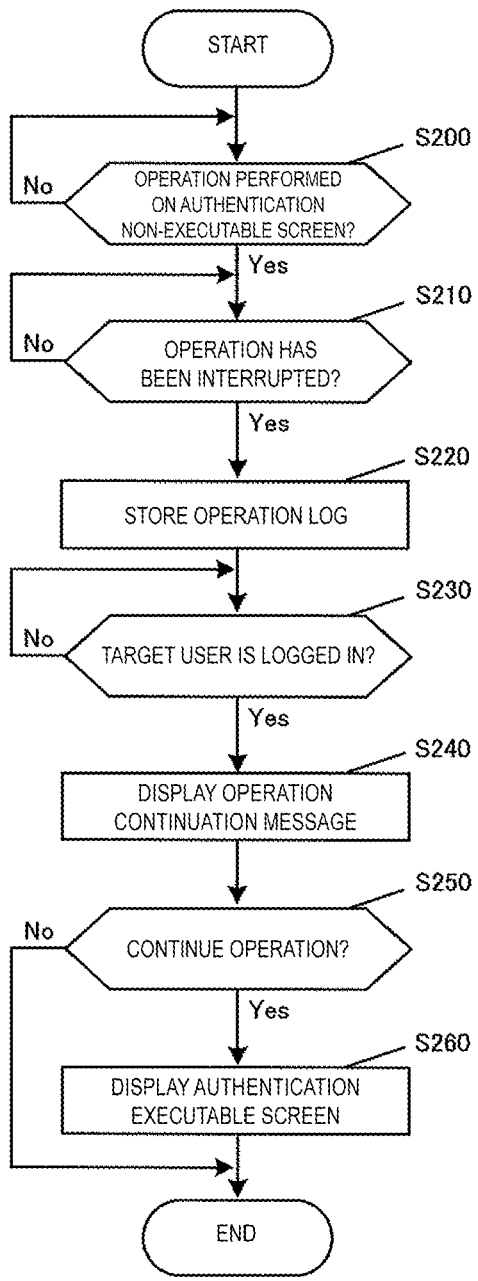
FIG. 12 is a flowchart illustrating a processing flow according to the second embodiment.
Figure 16:
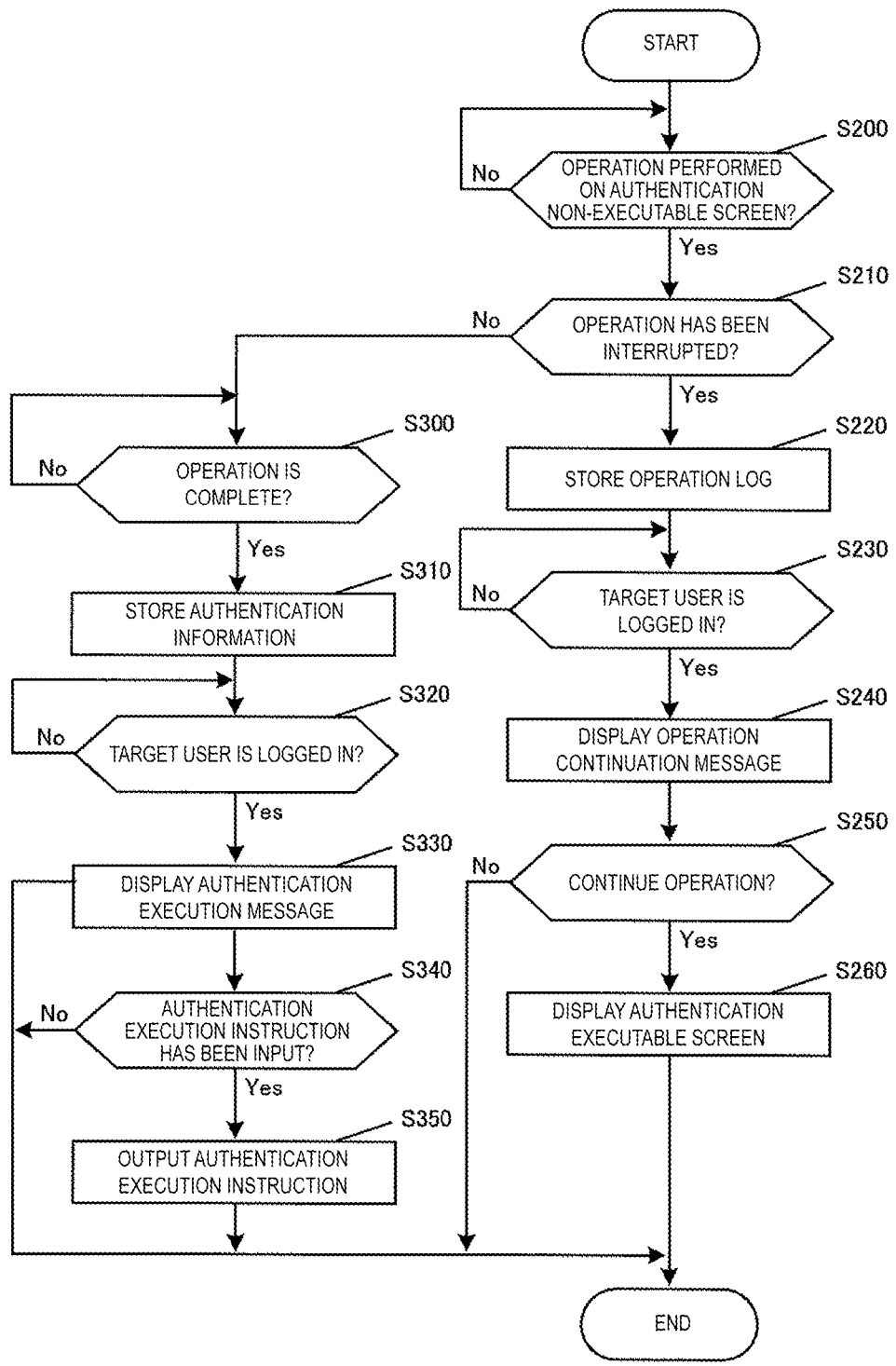
FIG. 16 is a flowchart illustrating a processing flow according to a third embodiment.

Processing according to the third embodiment can be achieved as processing in which the flowchart of FIG. 12 in the second embodiment is replaced with the flowchart of FIG. 16. Note that steps having the same processing operations as those described in FIG. 12 are denoted by the same step numbers, and description thereof is omitted.

In step S210 of FIG. 16, in a case where it is determined that the operation via the authentication non-executable screen is not interrupted, the controller 11 determines whether the operation is complete (No in Step S210 and proceeding to step S300). In a case where it is determined that the operation is complete, the controller 11 stores the input authentication information in the authentication (authorization) information storage area 239 (Yes in step S300 and proceeding to step S310). Note that in a case where it is determined that the operation is not complete, the controller 11 waits until the operation is complete (No in step S300).

Subsequently, the controller 11 determines whether the user (target user) who has input the authentication information is logged into the multifunction peripheral 70 (step S320).

In a case where it is determined that the target user is logged into the multifunction peripheral 70, the controller 11 displays an authentication execution message asking whether to execute the authentication processing on the display 13 (Yes in step S320 and proceeding to step S330). In a case where it is determined that the target user is not logged into the multifunction peripheral 70, the controller 11 waits until the target user logs into the multifunction peripheral 70 (No in step S320).

In a case of receiving an authentication execution instruction from the user in response to display of the authentication execution message, the controller 11 outputs the authentication execution instruction to the external service 50 and ends the processing (Yes in step S340 and proceeding to step S350). On the other hand, in a case where it is determined that the authentication execution instruction from the user has not been received, the controller 11 ends the processing (No in step S340).

3.3 Operation Example

Figure 17:
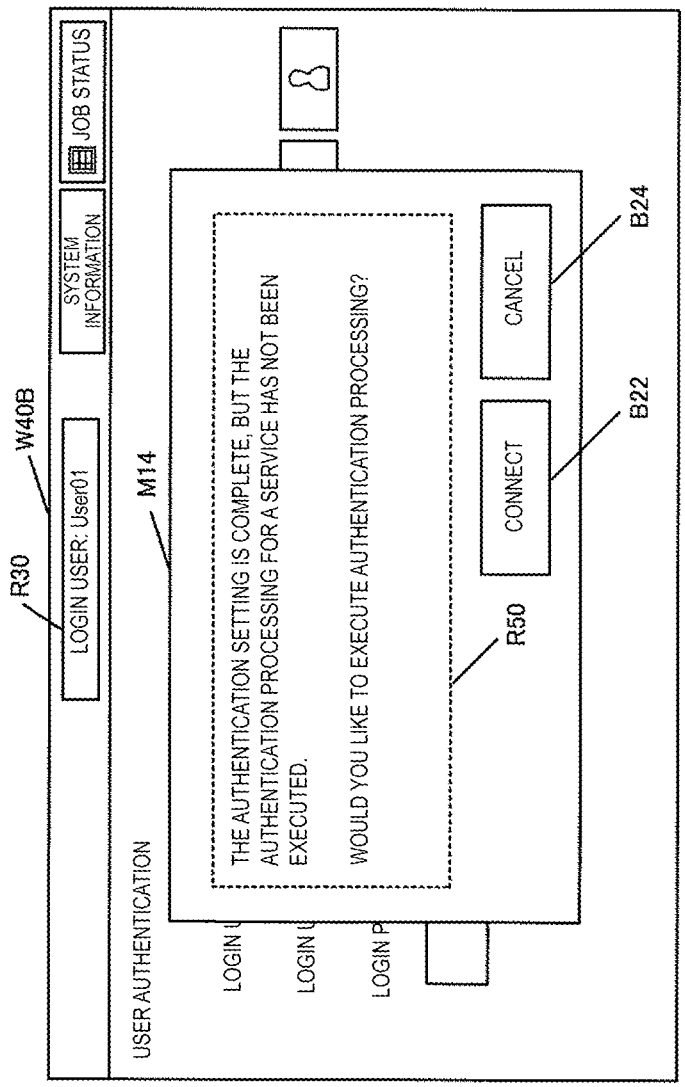
FIG. 17 is a diagram illustrating an operation example according to the third embodiment.

FIG. 17 is a diagram illustrating a configuration example of a message screen M14 displayed on a user authentication screen W40B by the controller 11 in a case where the target user has successfully logged into the multifunction peripheral 70. Note that FIG. 17 illustrates an example in which the message screen M14 displaying the authentication execution message asking whether to execute the authentication processing is superimposed on the user authentication screen W40B displaying, in the login user name display region R30, the login name (e.g., User01) of the target user who successfully logged in.

The message screen M14 includes a message display region R50, a "connect" button B22, and a "cancel" button B24. The message display region R50 is a display region displaying content for asking the target user whether to execute the authentication processing that was interrupted (ended) without being executed (e.g., "The authentication setting is complete, but the authentication processing for A service has not been executed. Would you like to execute the authentication processing?"). The "connect" button B22 is a button for receiving an execution instruction for the authentication processing from the user. The "cancel" button B24 is a button for receiving a selection instruction not to execute the authentication processing from the user. The user can output the execution instruction for the authentication processing to the external service 50 by selecting the "connect" button B22 after checking the message content displayed in the message display region R50. Note that the controller 11 may display the authentication executable screen upon selection of the "connect" button B22.

As described above, according to the third embodiment, in addition to the effects according to the first embodiment and the second embodiment, when the input of the authentication information via the authentication non-executable screen is complete, the authentication execution instruction with respect to the external service can be output based on the completed input content. This can save time and effort for inputting the authentication information in the multifunction peripheral and enhance user convenience.

The present disclosure is not limited to the embodiments described above and can be changed in various ways. More specifically, embodiments obtained by combining technical concepts changed as required without departing from the gist of the present disclosure are also included in the technical scope of the present disclosure.

Although some parts of the above-described embodiments are described separately for convenience of explanation, it is a matter of course that combinations are possible within a technically allowable range.

The programs running on each device in the embodiments are programs for controlling a CPU or the like (programs for causing a computer to function) to achieve the aforementioned functions according to the embodiments. The information handled by these devices is temporarily accumulated in a temporary storage device (e.g., a RAM) at the time of processing, is subsequently stored in a storage device such as a read only memory (ROM) or an HDD, and is read out, corrected, and written by the CPU as needed.

The recording medium storing the programs may be any of a semiconductor medium (e.g., a ROM or a nonvolatile memory card), an optical recording medium or a magneto-optical recording medium (e.g., a digital versatile disc (DVD), a magneto optical disc (MO), a mini disc (MD), a compact disc (CD), or a Blu-ray (trade name) disc (BD)), a magnetic recording medium (e.g., a magnetic tape or a flexible disk), or the like. While the aforementioned functions of the embodiments are realized by executing the loaded programs, the functions of the present disclosure may also be realized by performing processing in cooperation with an operating system or another application program based on instructions for the programs.

In a case where the programs are distributed to market, the programs can be stored and distributed in a portable recording medium, or can be transferred to a server computer connected via a network such as the Internet. In this case, it is a matter of course that the storage device of the server computer is also included in the present disclosure.

In addition, functional blocks or various features of the devices used in the above-described embodiments can be implemented and executed by an electrical circuit such as one or more integrated circuits. An electrical circuit designed to implement the functions described in the present specification may include a general-purpose processor, a digital signal processor (DSP), an application-specific integrated circuit (ASIC), a field-programmable gate array (FPGA), another programmable logic device, a discrete gate, a transistor logic, a discrete hardware component, or a combination thereof. The general-purpose processor may be a microprocessor or may be a processor, a controller, a microcontroller, or a state machine in the related art. The above-described electrical circuit may be configured of a digital circuit or an analog circuit. In addition, if semiconductor technology advances and integrated circuit technology replacing the current integrated circuit technology is developed, one or more aspects of the present disclosure can use a new integrated circuit based on this technology.

REFERENCE SIGNS LIST 10, 70 Multifunction peripheral
11 Controller
13 Display
15 Operation inputter
17 Image former
19 Image inputter
21 Communicator
23, 75 Storage
231 Authentication (authorization) program
233 Screen information output control program
235 Application program
237 Browser program
751 Login authentication program
239 Authentication (authorization) information storage area
241 Screen information storage area
753 Operation log storage area
30 External terminal device
31 Controller
33 Display
35 Operation inputter
37 Communicator
39 Storage
391 Authentication program
393 Browser program
395 Cooperative application program
397 Authentication information storage area
50 External service

The invention claimed is:

1. An image forming device comprising:
a display,
a communicator, and
one or more controllers, wherein
the one or more controllers output, in a case that an authentication method is capable of being set and an authentication method that requires a prior authorization by an authorization service is selected, screen information of a setting screen corresponding to the authentication method that requires the prior authorization by the authorization service to the display or via the communicator to an external terminal device, and
the one or more controllers determine a display content of the setting screen based on an output destination of the screen information and output the screen information including the display content.

2. The image forming device according to claim 1, wherein
the one or more controllers determine the display content of the setting screen based on an acquisition mode of redirection from the authorization service at the output destination of the screen information.

3. The image forming device according to claim 2, wherein
the one or more controllers
output first screen information including a display content of accepting an execution of authentication processing in a case of an acquisition mode in which the redirection is capable of being acquired, and
output second screen information including a display content of restricting the execution of the authentication processing in a case of an acquisition mode in which the redirection is incapable of being acquired.

4. The image forming device according to claim 3, wherein
the first screen information comprises screen information related to the setting screen displayed on the display of the image forming device, and
the second screen information comprises screen information related to the setting screen displayed on a display of the external terminal device.

5. The image forming device according to claim 3, wherein
the second screen information is displayed via a web page.

6. The image forming device according to claim 1, wherein
the one or more controllers output, in a case that an authentication method that does not require the prior authorization by the authorization service is selected, screen information including the same display content to the display of the image forming device or to a display of the external terminal device.

7. The image forming device according to claim 1, wherein
when receiving the authentication method selected by a user, the one or more controllers perform control to determine the display content of the setting screen and output the screen information.

8. The image forming device according to claim 3, wherein
the one or more controllers include, in a display content of the setting screen, based on the second screen information, a message prompting the execution of the authentication processing via the setting screen based on the first screen information.

9. The image forming device according to claim 3, wherein
the one or more controllers include, in a display content of the setting screen, based on the second screen information, information necessary for the authentication processing, and receive an operation instruction to register, change, or delete the information.

10. The image forming device according to claim 3, wherein
the one or more controllers display a connection button that receives an execution instruction for the authentication processing on the setting screen based on the first screen information.

11. The image forming device according to claim 4, wherein
in a case that an operation via the display of the external terminal device is interrupted and then a user who has interrupted the operation logs into the image forming device, the one or more controllers display a message asking whether to continue the operation on the display of the image forming device.

12. An output method of outputting screen information to a display device, the output method comprising:
determining whether to output screen information of a setting screen corresponding to an authentication method, that requires a prior authorization by an authorization service, to a display device of an image forming device or to a display device of an external terminal device;
determining a display content of the setting screen based on the determined output destination of the screen information; and
outputting the screen information including the display content.

* * * * *